(12) United States Patent
Otohata (10) Patent No.: US 10,587,002 B2
(45) Date of Patent: Mar. 10, 2020

(54) SECONDARY BATTERY, METHOD FOR MANUFACTURING SECONDARY BATTERY, ELECTRIC VEHICLE AND ELECTRICITY STORAGE SYSTEM

(71) Applicant: NEC CORPORATION, Tokyo (JP)

(72) Inventor: Makihiro Otohata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 134 days.

(21) Appl. No.: 15/560,185

(22) PCT Filed: Mar. 23, 2016

(86) PCT No.: PCT/JP2016/059212
§ 371 (c)(1),
(2) Date: Sep. 21, 2017

(87) PCT Pub. No.: WO2016/152922
PCT Pub. Date: Sep. 29, 2016

(65) Prior Publication Data
US 2018/0102568 A1    Apr. 12, 2018

(30) Foreign Application Priority Data

Mar. 24, 2015   (JP) ................................. 2015-061534

(51) Int. Cl.
*H01M 2/02*       (2006.01)
*H01M 10/0525*    (2010.01)
(Continued)

(52) U.S. Cl.
CPC ........ *H01M 10/0525* (2013.01); *H01G 11/12* (2013.01); *H01G 11/52* (2013.01);
(Continued)

(58) Field of Classification Search
None
See application file for complete search history.

(56) References Cited

U.S. PATENT DOCUMENTS

2006/0019151 A1   1/2006  Imachi et al.
2007/0128513 A1*  6/2007  Hatta .................... H01M 2/021
                                                        429/176
(Continued)

FOREIGN PATENT DOCUMENTS

JP       59-180962 A    10/1984
JP      2001-351692 A   12/2001
(Continued)

OTHER PUBLICATIONS

International Search Report for PCT/JP2016/059212 dated Jun. 14, 2016 [PCT/ISA/210].
Written Opinion for PCT/JP2016/059212 dated Jun. 14, 2016 [PCT/ISA/237].
(Continued)

*Primary Examiner* — Lucas J. O'Donnell
(74) *Attorney, Agent, or Firm* — Sughrue Mion, PLLC (57) ABSTRACT

The secondary battery comprises: a battery element 20 having a positive electrode 30 wherein positive active material 31 are applied on both surfaces of a positive current collector 32, a negative electrode 40 wherein negative active material 41 are applied on both surfaces of a negative current collector 42, and a separator; a packaging film 10, made of a film that includes a heat-seal resin layer 13, for accommodating the battery element; wherein a melting point or a decomposition temperature of the separator is higher than a melting point of the heat-seal resin layer by 50° C. or more; and wherein, at least a part of the active material layer 31, 41 of the positive electrode or the negative electrode and the heat-seal resin layer are heat-sealed to each other at at least one surface of the upper surface and the lower surface of the battery element.

16 Claims, 5 Drawing Sheets

(51) Int. Cl.
  *H01M 10/04* (2006.01)
  *H01M 10/0585* (2010.01)
  *H01M 2/16* (2006.01)
  *H01G 11/52* (2013.01)
  *H01M 10/052* (2010.01)
  *H01G 11/78* (2013.01)
  *H01G 11/12* (2013.01)
  *H01G 11/80* (2013.01)
  *H01M 2/26* (2006.01)
  *H01G 11/06* (2013.01)

(52) U.S. Cl.
  CPC ............ *H01G 11/78* (2013.01); *H01G 11/80* (2013.01); *H01M 2/02* (2013.01); *H01M 2/0275* (2013.01); *H01M 2/0287* (2013.01); *H01M 2/16* (2013.01); *H01M 2/263* (2013.01); *H01M 10/04* (2013.01); *H01M 10/052* (2013.01); *H01M 10/0585* (2013.01); *H01G 11/06* (2013.01); *Y02E 60/122* (2013.01); *Y02P 70/54* (2015.11); *Y02T 10/7011* (2013.01)

(56) References Cited

U.S. PATENT DOCUMENTS

2016/0301052 A1* 10/2016 Adams ............... H01M 2/145
2017/0033418 A1*  2/2017 Suzuki ............. H01M 10/0413

FOREIGN PATENT DOCUMENTS

| JP | 2007-026676 A | 2/2007 |
| JP | 2007-157460 A | 6/2007 |
| JP | 2007-305574 A | 11/2007 |
| JP | 2008-021635 A | 1/2008 |
| JP | 2012-204356 A | 10/2012 |
| JP | 2012-529753 A | 11/2012 |
| JP | 2014-127342 A | 7/2014 |
| JP | 2014-240189 A | 12/2014 |

OTHER PUBLICATIONS

Communication dated May 5, 2019 from the China National Intellectual Property of Administration in counterpart Application No. 201680018206.4.

Decision to Grant a Patent dated Dec. 24, 2019 issued by the Japanese Patent Office in counterpart Application No. 2017-508393.

* cited by examiner

Fig.9

SECONDARY BATTERY, METHOD FOR MANUFACTURING SECONDARY BATTERY, ELECTRIC VEHICLE AND ELECTRICITY STORAGE SYSTEM

CROSS REFERENCE TO RELATED APPLICATIONS

This application is a National Stage of International Application No. PCT/JP2016/059212 filed Mar. 23, 2016, claiming priority based on Japanese Patent Application No. 2015-061534 filed Mar. 24, 2015, the contents of all of which are incorporated herein by reference in their entirety.

TECHNICAL FIELD

The present invention relates to a secondary battery in which a packaging film accommodates a battery element and manufacturing method of the same and the like.

BACKGROUND ART

Recently, downsizing or light weightening is strongly required for batteries to be used for a power source of electrical devices or vehicles or the like. With respect to an package of the battery, packages using a laminated film have increased, instead of conventional type that uses a metal case. As a laminated film, in general, aluminum is used for a metal foil; nylon (registered trademark) or polyethylene terephthalate is used for a heat-seal resin film on the outer surface of the battery, and polyethylene or polypropylene is used for the inner surface. A film packaged battery is a battery in which the battery element is accommodated in the package made of the laminated film (also referred to as "packaging film") together with electrolyte. Positive electrode tab and negative electrode tab come from the battery element, and each of the electrode tabs extends toward outside of the packaging film.

However, when an impact force is applied to the film packaged battery, the battery element might move within the packaging film. This would cause troubles such as a disconnection between the battery element and the electrode tab or a short between the positive electrode and the negative tab or between the negative electrode and the positive tab. To secure the packaging film and the battery element, a connecting technique is known in which the positive current collector and the negative current collector are connected to a heat-seal layer inside of the laminated film by heat-sealing, for example (Patent Document 1). Additionally, a separator that covers the outermost surface of the battery element is connected to the heat-seal layer inside of the laminated film by heat-sealing (Patent Document 2). It is also known that the battery element and a battery case are secured by using a seal tape that includes the thermosetting resin adhesive material (Patent Document 3).

PRIOR ART DOCUMENTS

Patent Document 1: Japanese Patent Laid-Open No. S59-180962
Patent Document 2: Japanese Patent Laid-Open No. 2001-351692
Patent Document 3: Japanese Patent Laid-Open No. 2012-529753

SUMMARY OF INVENTION

Technical Problem

However, when using the technique disclosed in the Patent Document 1, it is necessary to form a large current collector portion where an active material is provide on just one surface. In this case, the other current collector portion where active materials are provide on both surfaces of the current collector. If there is a process of pressing the current collector with a press machine after providing active material on the current collector for example by applying, the electrode becomes curved that would lead to handling difficulty, because there is an expansion coefficient difference between the active material layer and the current collector foil during pressing, in the electrode portion where the active material is formed on just one.

When using the technique disclosed in the Patent Document 2, separators in the battery element might be melting during heat-sealing of the outermost separator of the battery element to the innermost heat-seal resin layer of the laminated film. As a result, a shutdown might occur in which the pores in the separator though which supporting electrolyte and the like move are blocked, or a short between the positive electrode and the negative electrode due to shrink of the separator might occur. Additionally, if a separator is used wherein the separator has a higher melting point than that of the innermost heat-seal resin layer of the laminated film, a heat-sealing at a temperature in which no shutdown of the separator would occur might cause the following problem. Specifically, the melted resin material of inside of the laminated film engages in the fine concavo-convex of the separator surface to obtain an anchoring effect, and a melting is achieved only by this anchoring effect, accordingly the separator with a flat surface cannot obtain enough anchoring effect and thus a sufficient connecting strength cannot be obtained. Furthermore, since the hardness of the separator itself is low, when impact force is applied to the battery, there is a problem in that an effect of securing the battery element would decrease with respect to the separator that has been heat-sealed to the innermost resin layer of the laminated film. This is because, in such a configuration, the separator tends to act as a component of the outer film rather than a component of the battery element.

When using the technique disclosed in the Patent Document 3, there is a cost-increasing problem due to process for preparing a seal tape and applying the seal tape on the battery element, and to process for fixing the battery element to which the seal tape has been applied to the battery case.

Moreover, in both Patent Documents 2 and 3, since the electrode and the separator of the outermost of the battery element which do not contribute to charging/discharging of the battery cannot be invalid, excess electrolyte for immersing the electrode and separator that is non-contributable to charging/discharging is needed. Therefore, cost, battery weight and battery size would increase. Additionally, supporting electrolyte would reach to the electrode at the outermost of the battery element, from the electrode surface that can contribute to charging/discharging, and it would be absorbed on the surface that cannot contribute to charging/discharging. It is impossible to avoid the battery capacity from decreasing, since the absorbed electrolyte corresponds to irreversible volume portion.

The present inventions are invented from viewpoints of the above problems and the objective of the present invention is to provide secondary battery and manufacturing method of the same and the like, which can retain a battery property when impact force from outside is applied to the film packaged battery.

Means for Solving the Problems

A secondary battery to achieve the above objective according to an embodiment of the present inventions is as follows:

A secondary battery, comprising:

a battery element having a positive electrode wherein positive active material are applied on both surfaces of a positive current collector, a negative electrode wherein negative active material are applied on both surfaces of a negative current collector, and a separator;

a packaging film, made of a film that includes a heat-seal resin layer, for accommodating the battery element;

wherein a melting point or a decomposition temperature of the separator is higher than a melting point of the heat-seal resin layer by 50° C. or more;

and wherein, at least a part of the active material layer of the positive electrode or the negative electrode and the heat-seal resin layer are heat-sealed to each other at at least one surface of the upper surface and the lower surface of the battery element.

(Description of Terms)

"Film packaged battery" refers to a battery in which a battery element is accommodated in a packaging film together with electrolyte, in general, it has flat shape as a whole. For example, with respect to a battery for electrical vehicle, a large battery capacity, a low internal resistance, a high heat dissipation and the like are required, however, the film package battery is preferable for these points.

"Packaging film" refers to a packaging member made of a flexible film (not limited to a configuration which consists only of film(s)) for accommodating the battery element. It may be a configuration in which two films facing to each other and sealed to thereby close the battery element, or a configuration in which a single film is folded with its facing surfaces sealed to each other to thereby close the battery element.

With respect numerical range such as the expression "a-b", it means a or more to b or less.

Effect of Invention

According to the present invention, a secondary battery and manufacturing method of the same and the like, which can retain a battery property when impact force from outside is applied to the film packaged battery can be obtained.

DESCRIPTION OF EMBODIMENT

1. Basic Structure of the Film Packaged Battery

Basic structure of the film packaged battery will be described in reference to FIG. 1 to FIG. 3. As described below, the battery according to one embodiment of the present invention is characterized for example by that at least a part of the electrode active material layer of the battery element and at least a part of the heat-seal rein layer of the laminated film are heat-sealed. For convenience of explanation, such features are not shown in FIG. 1 to FIG. 3.

In the following description, the battery element will be described as an example of the stacked type film packaged battery, however, the present inventions are applicable not only to the stacked type battery but also to batteries such as winding types.

A film packaged battery 3 according to one embodiment of the present invention comprises a battery element 20, a packaging film 10 for accommodating the battery element together with the electrolyte, a positive electrode tab 50 and a negative electrode tab 51 (also simply referred to as "electrode tab") connected to the battery element and drawn toward outside of the packaging film 10.

In the battery element 20, a plurality of positive electrodes 30 and negative electrodes 40, made of a metal foil and both surface on which the electrode materials have been applied respectively, are stacked alternatively with inserting separators 60 therebetween. The entire shape of the battery element 20 is not limited to a specific shape, but a flat substantially rectangular parallelepiped shape is used in this example.

The positive electrode 30 and the negative electrode 40 have an extending portion at a part of the periphery portions that protrudes partially. The extending portions of the positive electrode 30 and the extending portions of the negative electrode 40 are arranged alternatively with those positions shifted, so as not to interfere with each other when the positive electrodes and negative electrodes are stacked. All the extending portion of the negative electrode are gathered and connected to the negative electrode 51. Similarly, with respect to the positive electrode, all the extending portion of the positive electrode are gathered and connected to the positive electrode 50 (refer to FIG. 3). Such a portion, the extending portions are gathered in a stacked direction may be referred to as "current collector portion". For connecting the current collector portion and the electrode, resistance welding, ultrasonic welding, laser welding, caulking, adhesion by conductive adhesive or the like can be used.

Various kinds of materials can be used for the electrode tab, however, in one example, the positive electrode tab 50 is aluminum or aluminum alloy, and the negative electrode tab 51 is copper or nickel. If material of the negative electrode tab 51 is copper, nickel may be disposed on the surface.

2. Configuration of the Each Component

Specific configurations for each component of the battery element may be as follows:

As a separator 60, for example, aramid, polyimide, polyester, cellulose, a polyolefin-type resin such as polyethylene or polyproprene may be used. Polyolefin-type resin, whose melting point has been increased after crosslinking by electron beam irradiation or addition of a crosslinking agent may be used. Any structure such as a woven fabric, a non-woven fabric, or a microporous membrane may be used. The melting point or the decomposition temperature of the separator is preferably higher than that of the heat-seal layer of the laminate film by 50° C. or more, 100° C. or more, or 200° C. or more. Form of the separator may be a web or a sheet. The above features can be used alone or in combination.

As a separator, it is also possible to use a separator formed of an inorganic material such as ceramic or glass. The examples of inorganic separators include:

nonwoven fabric separators formed of ceramic short fibers such as alumina, alumina-silica, potassium titanate, and the like;

separators comprising a substrate of a woven fabric, a nonwoven fabric or a porous film, and a layer containing a heat-resistant nitrogen-containing aromatic polymer and a ceramic powder;

porous thin film layer separators in which a heat-resistant layer is provided on a part of the surface, wherein the heat-resistant layer is formed of a porous thin layer containing ceramic powder, a porous thin layer of a heat-resistant resin, or a composite of ceramic powder and heat-resistant resin;

separators comprising a layer of a porous film in which secondary particles formed by sintering or dissolving-recrystallizing a part of primary particles of a ceramic material are bound by a binder;

separators comprising a porous film formed by binding a ceramic material and a binder, wherein the ceramic material is selected from silica ($SiO_2$), alumina ($Al_2O_3$), zirconium oxide ($ZrO_2$), titanium oxide ($TiO_2$), nitrides of silicon (Si), hydroxides of aluminum (Al), alkoxides of zirconium (Zr) and ketone compounds of titanium (Ti); and separators comprising a polymer substrate and a ceramic-containing coating layer of $Al_2O_3$, MgO, $TiO_2$, $Al(OH)_3$, $Mg(OH)_2$, $Ti(OH)_4$ formed on the polymer substrate; and the like.

<Negative Electrode>

The negative electrode 40 has a negative current collector 42 made of a metal foil and negative active material layers 41 applied on both surfaces of the negative current collector. The negative active material layer is bound by negative electrode binder so as to cover the negative current collector. The negative current collector has an extending portion which is connected to a negative electrode terminal, and no negative active material is applied on this extending portion.

The negative electrode active material in present Embodiment is not particularly limited; examples of the negative electrode active material include a carbon material (a) capable of occluding and releasing lithium ion, a metal (b) capable of alloying with lithium, and a metal oxide (c) capable of occluding and releasing lithium ion.

Examples of the carbon material (a) include: carbon, amorphous carbon, diamond-like carbon, carbon nanotube, and composite products of these. A high crystallinity carbon is high in electrical conductivity, and excellent in the adhesiveness to the negative electrode current collector made of a metal such as copper and the voltage flatness. On the other hand, a low crystallinity amorphous carbon is relatively smaller in volume expansion, accordingly high in the effect of alleviating the volume expansion of the whole negative electrode, and hardly undergoes degradations due to non-uniformities such as grain boundary and defects.

Examples of the metal (b) include: Al, Si, Pb, Sn, In, Bi, Ag, Ba, Ca, Hg, Pd, Pt, Te, Zn and La; or alloys of two or more of these. These metals or these alloys may also be used as mixtures of two or more thereof. These metals or these alloys may also contain one or more nonmetal elements.

In one embodiment, tin or silicon is preferably contained as a negative electrode active material, and silicon is more preferably contained. This is because tin or silicon can occlude at most 4.4 lithium atoms per one atom thereof to be large in capacity, and these elements themselves are actually successfully used in various fields and are easy to handle. Moreover, silicon is an element lighter than tin, and hence is higher in the capacity per unit weight.

Examples of the metal oxides (c) include: silicon oxide, aluminum oxide, tin oxide, indium oxide, zinc oxide, lithium oxide, or composite products of these. In one embodiment, as the negative electrode active material, tin oxide or silicon oxide is preferably contained, and silicon oxide is more preferably contained. This is because silicon oxide is relatively stable and hardly causes reaction with other compounds. In the metal oxide (c), one or two or more elements selected from among nitrogen, boron and sulfur can be added, for example, in a content of 0.1 to 5% by mass. In this way, the electrical conductivity of the metal oxide (c) can be improved.

The metal oxide (c) preferably has amorphous structure in the whole thereof or in a fraction thereof. The metal oxides (c) having amorphous structure can suppress the volume expansion of the carbon material (a) or the metal (b), which is another negative electrode active material. The mechanism involved in the volume suppression is not clear; however, it is inferred that the metal oxide (c) is of an amorphous structure, and hence has a certain effect on the coat formation on the interface between the carbon material (a) and the electrolyte. Additionally, the amorphous structure is considered to be relatively fewer in the factors due to the nonuniformity such as grain boundary or defects. It is to be noted that the fact that the metal oxide (c) has amorphous structure in the whole thereof or in a fraction thereof can be verified by X-ray diffraction measurement (general XRD measurement). Specifically, when the metal oxide (c) has no amorphous structure, the peak inherent to the metal oxide (c) is observed; the case where the metal oxide (c) has amorphous structure in the whole thereof or in a fraction thereof is observed as the broadening of the peak inherent to the metal oxide (c).

The metal (b) is preferably silicon, and the metal oxide (c) is preferably silicon oxide. In other words, the negative electrode active material is preferably made of a composite substance (hereinafter, also referred to as "the Si/SiO/C composite substance) composed of silicon, silicon oxide and a carbon material. It is also possible to use, as the negative electrode active material, a material in which lithium is doped beforehand chemically or thermally. For example, the chemically doped material can be obtained by a method in which lithium is compulsorily doped into the active material by using a solvent that contains lithium metal or a lithium compound and by using a reducing agent. In the thermal doping, lithium can be doped into the negative electrode active material by the method in which the negative electrode active material and lithium metal are brought into contact with each other, and then wholly heated.

In the Si/SiO/C composite substance, for example, the whole or a fraction of silicon oxide is of an amorphous structure, and the whole or a fraction of silicon is dispersed in silicon oxide. Such a Si/SiO/C composite substance can be prepared, for example, by such a method as disclosed in Japanese Patent Laid-Open No. 2004-47404. Specifically, the Si/SiO/C composite substance can be obtained, for example, by performing a CVD treatment of silicon oxide in an atmosphere containing an organic substance gas such as methane gas. The Si/SiO/C composite substance obtained by such a method is in a form in which the surface of the particles made of silicon oxide containing silicon is covered with carbon. In silicon oxide, silicon is present as nanoclusters.

In the Si/SiO/C composite substance, the proportions of the carbon material, silicon and silicon oxide are not particularly limited. The proportion of the carbon material in the Si/SiO/C composite substance is set to be preferably 2% by mass or more and 50% by mass or less and more preferably 2% by mass or more and 30% by mass or less. The proportion of silicon in the Si/SiO/C composite substance is set to be preferably 5% by mass or more and 90% by mass or less and more preferably 20% by mass or more and 50% by mass or less. The proportion of silicon oxide in the Si/SiO/C composite substance is set to be preferably 5% by mass or more and 90% by mass or less and more preferably 40% by mass or more and 70% by mass or less.

The Si/SiO/C composite substance can be composed of a mixture of a carbon material, silicon and silicon oxide. For example, the Si/SiO/C composite substance can be obtained by mixing a particulate carbon material, particulate silicon and particulate silicon oxide. For example, a constitution can be adopted in which the average particle size of silicon is smaller than the average particle size of the carbon material and the average particle size of silicon oxide. In this way, silicon undergoing a large volume variation caused at the time of charging and discharging has a relatively smaller particle size, and the carbon material and silicon oxide each undergoing a small volume variation caused at the time of charging and discharging, each have a relatively larger particle size, and hence the production of dendrites and the formation of fine particles of alloys are more effectively suppressed. In the charging and discharging processes, lithium is occluded and released in the order of large particle size particles, small particle size particles and large particle size particles, and hence, from this viewpoint, the occurrence of the residual stress and the residual strain is suppressed. The average particle size of silicon can be made to be, for example, 20 μm or less, and is made to be preferably 15 μm or less.

As the negative electrode binder, for example, the following can be used, without being particularly limited to the following: polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and polyacrylic acid. Among these, polyimide and polyamideimide are preferable because of being strong in binding capability. The amount of the negative electrode binder used is preferably 5 to 25 parts by mass in relation to 100 parts by mass of the negative electrode active material from the viewpoint of "sufficient binding strength" and "achievement of high energy" being in a trade-off relation.

As the negative electrode current collector, aluminum, nickel, stainless steel, chromium, copper, silver, and alloys of these are preferable from the viewpoint of the electrochemical stability. Examples of the shape of the negative electrode current collector include foil, flat plate and mesh.

<Positive Electrode>

The positive electrode 30 has a positive current collector 32 made of a metal foil and a positive active material 31 applied on both of the positive current collector. The positive active material layer is bound by positive electrode binder so as to cover the positive current collector. The positive current collector has a extending portion which is connected to a positive electrode terminal, and no positive active material is applied on this extending portion.

The positive electrode active material is not particularly limited as long as it is a material capable of absorbing and desorbing lithium, but a high-capacity compound is preferably contained from the viewpoint of high energy density. Examples of the high-capacity compound include nickel lithate ($LiNiO_2$) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \quad (A)$$

(provided that $0 \leq x < 1$, $0 < y \leq 1.2$, and M is at least one element selected from the group consisting of Co, Al, Mn, Fe, Ti, and B.)

From the viewpoint of high capacity, the Ni content is preferably high, or that is to say, x is less than 0.5 in formula (A), and more preferably 0.4 or less. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0 < \alpha \leq 1.2$ preferably $1 \leq \alpha \leq 1.2$, $\beta+\gamma+\delta=1$, $\beta \geq 0.6$ preferably $\beta \geq 0.7$, $\gamma \leq 0.2$), and, in particular, $LiNi_\beta Co_\gamma Mn_\delta O_2$ ($0.75 \leq \beta \leq 0.85$, $0.05 \leq \gamma \leq 0.15$, $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ ($0 \leq \alpha \leq 1.2$ preferably $1 \leq \alpha \leq 1.2$, $\beta+\gamma+\delta=1$, $0.2 \leq \beta \leq 0.5$, $0.1 \leq \gamma \leq 0.4$, $0.1 \leq \delta \leq 0.4$). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ and those obtained by partially replacing these transition metals with other metals; those having an excess of Li based on the stoichiometric compositions of these lithium transition metal oxides; and those having an olivine structure such as LiFePO$_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

It is also possible to use a radical material or the like as a positive electrode active material.

A positive electrode binding agent similar to the negative electrode binding agent can be used. The amount of the positive electrode binding agent used is preferably 2 to 15 parts by mass based on 100 parts by mass of the positive electrode active material from the viewpoint of a trade-off between "sufficient binding strength" and "high energy".

As a positive current collector, the same member as the negative current collector can be used.

An electroconductive auxiliary material may be added to a coating layer of the positive electrode active material to lower impedance. Carbonaceous microparticles such as graphite, carbon black, and acetylene black can be used as electroconductive auxiliary materials.

<Electrolyte>

As the electrolyte used in the present embodiment, a non-aqueous electrolytic solution containing a lithium salt (a supporting electrolyte) and a non-aqueous solvent that dissolves this supporting electrolyte can be used.

Aprotic organic solvents such as carbonic acid esters (chain or cyclic carbonates), carboxylic acid esters (chain or cyclic carboxylic acid esters), and phosphoric acid esters can be used as non-aqueous solvents.

Examples of the carbonic acid ester solvents include cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); and propylene carbonate derivatives.

Examples of the carboxylic acid ester solvents include aliphatic carboxylic acid esters such as methyl formate, methyl acetate, and ethyl propionate; and lactones such as γ-butyrolactone.

Among these, carbonic acid esters (cyclic or chain carbonates) such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC) are preferable.

Examples of the phosphoric acid esters include trimethyl phosphate, triethyl phosphate, tripropyl phosphate, trioctyl phosphate, and triphenyl phosphate.

Also, other examples of solvents that can be contained in the non-aqueous electrolytic solution include ethylene sulfite (ES), propane sultone (PS), butane sultone (BS), dioxathiolane-2,2-dioxide (DD), sulfolene, 3-methylsulfolene, sulfolane (SL), succinic anhydride (SUCAH), propionic anhydride, acetic anhydride, maleic anhydride, diallyl carbonate (DAC), dimethyl 2,5-dioxahexanedioate, dimethyl 2,5-dioxahexanedioate, furan, 2,5-dimethylfuran, diphenyl disulfide (DPS), dimethoxyethane (DME), dimethoxymethane (DMM), diethoxyethane (DEE), ethoxymethoxyethane, chloroethylene carbonate, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, carbonate electrolytic solutions, glyme, ether, acetonitrile, propionitrile, γ-butyrolactone, γ-valerolactone, dimethylsulfoxide (DMSO) ionic liquids, phosphazene, aliphatic carboxylic acid esters such as methyl formate, methyl acetate, and ethyl propionate, and those obtained by replacing some hydrogen atoms of these compounds with fluorine atoms.

Lithium salts usable in commonly used lithium ion batteries, such as LiPF$_6$, LiAsF$_6$, LiAlCl$_4$, LiClO$_4$, LiBF$_4$, LiSbF$_6$, LiCF$_3$SO$_3$, LiC$_4$F$_9$SO$_3$, LiC(CF$_3$SO$_2$)$_3$, and LiN(CF$_3$SO$_2$)$_2$, can be used as supporting electrolytes in the present embodiment. One supporting electrolyte can be used singly, or two or more can be used in combination.

The nonaqueous solvents can be used each alone, or in combinations of two or more thereof.

<Packaging Film>

Figure 2:
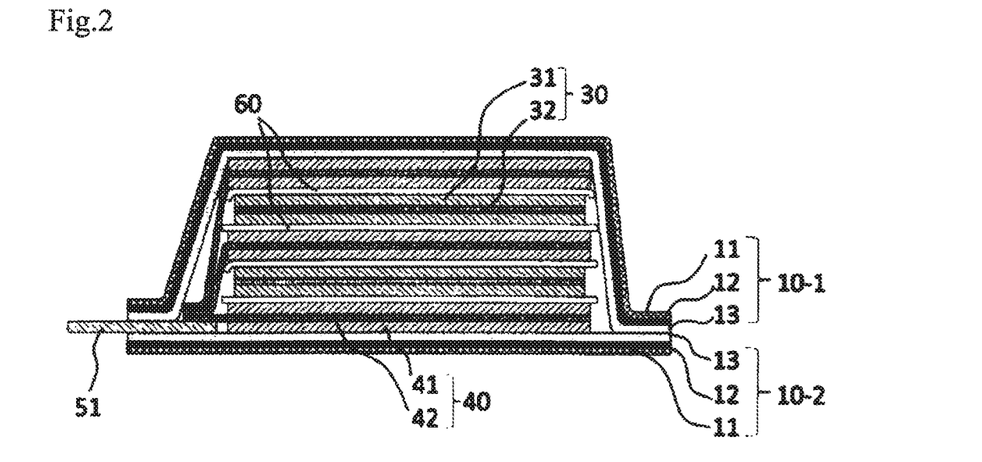
FIG. 2 is a sectional view that schematically shows a section of the battery of FIG. 1.

For a packaging film, a laminated film can be used as shown in FIG. 2, which includes a surface layer 11, a metal layer 12 and an inner layer 13. The metal layer 12 may be aluminum, the surface layer 11 may be nylon (registered trademark) or polyethylene terephthalate, and the inner layer 13 may be polyolefin resin such as polyethylene or polypropylene. The inner layer 13 may be a polyethylene having a melting point of 95° C. to 140° C., or a polypropylene having a melting point of 160° C. to 165° C.

Figure 1:
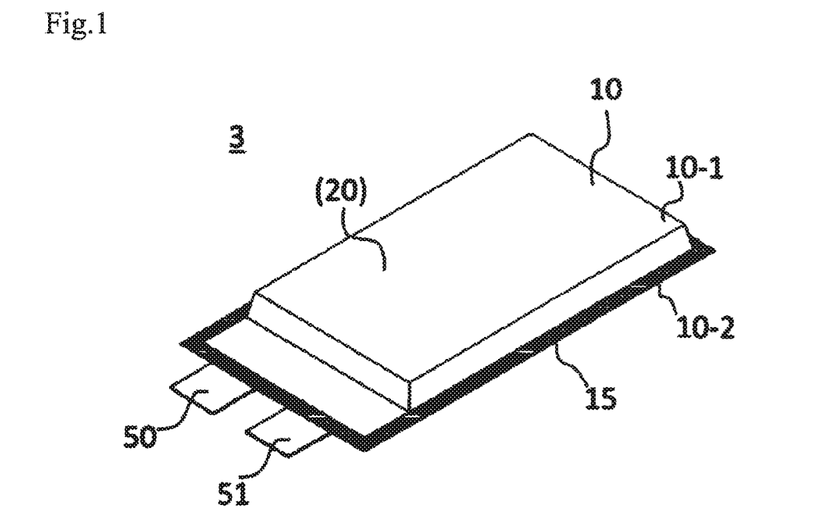
FIG. 1 is a perspective view that shows a basic configuration of the film packaged battery in an embodiment on the present invention.
Figures 3, 4:
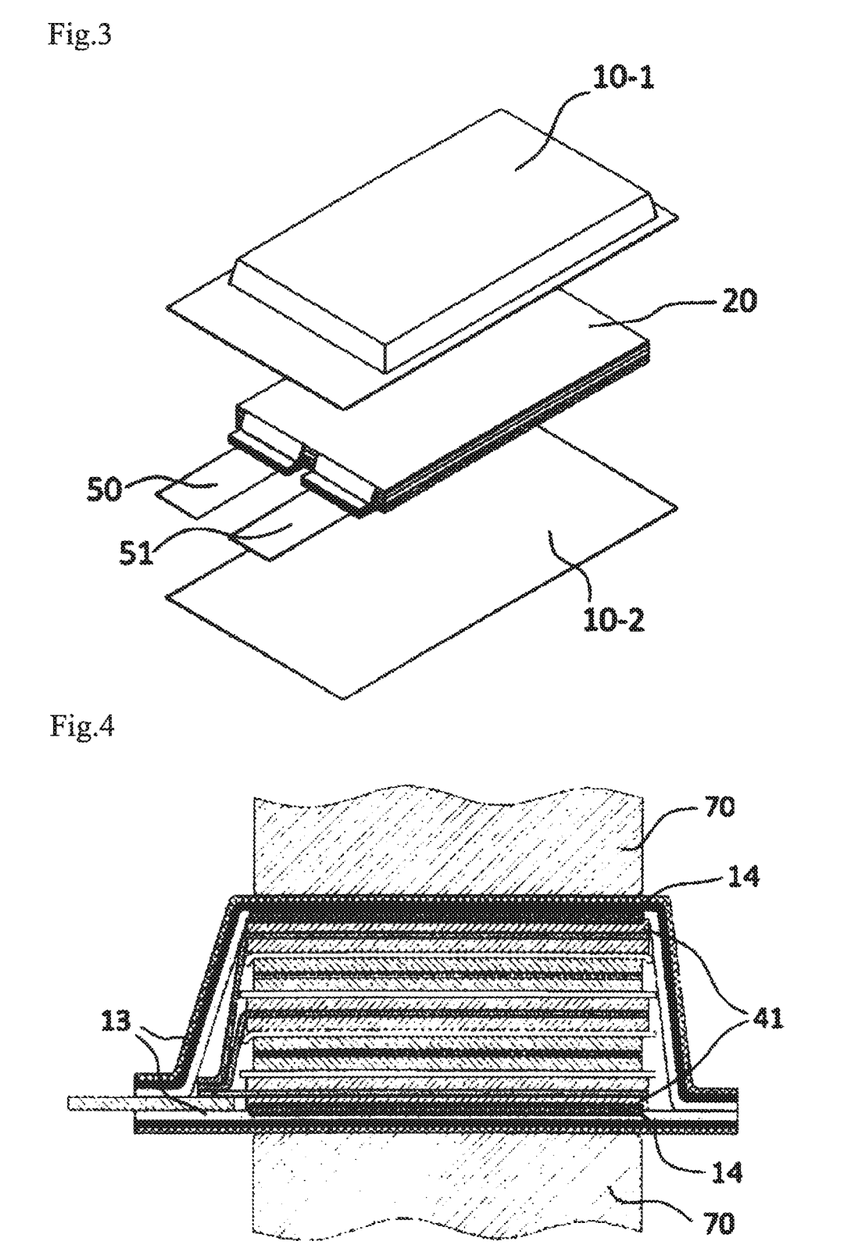
FIG. 3 is a perspective view that shows disassembled internal configuration of the film packaged battery.
FIG. 4 is a sectional view that schematically shows a a section of the battery of FIG. 1 (during pressing with the heat press machine).

In the present embodiment, as shown in FIG. 1 to FIG. 3, the packaging film 10 may have two films 10-1 and 10-2 facing to each other. Although it is not shown, a configuration in which a single film is folded may be used. Outer shape of the packaging film 10 is not limited to a specific shape, but may be square, specifically rectangular in this example.

The films 10-1 and 10-2 are heat-sealed to each other at the peripheral portion of the battery element 20, thus a heat-sealed portion 15 is formed along a circumference portion of the packaging film 10.

In the drawing, the positive electrode tab 50 and the negative electrode tab 51 are drawn out from a short side of the heat-sealed portion 15. However, it may be drawn out from different sides including a long side. It is preferable that the positive electrode tab 50 and the negative electrode tab 51 are in parallel in one embodiment, but the present invention is not limited thereto. It is noted that as shown in FIG. 3, the film 10-1 is provide with a cup portion, whereas the other film 10-2 is provided with no cup portion. Alternatively, both the films may be provided with cup portions (not shown), or both the films may be provided with no cup portions (not shown).

(Heat Seal between Inner Face of Film and Electrode)

In the present embodiment, as shown in FIG. 4, at least a part of the active material layer of the outermost electrode of the battery element and the inner layer 13 of the laminated film are heat-sealed. In the drawing, the heat-sealed portion is shown as a heat-sealed portion 14. Although FIG. 4 shows a configuration in which the active material layers of the electrodes are heat-sealed to the inner surfaces on both of the upper surface and the lower surface of the battery element, the present invention is not necessarily limited to such a configuration. Heat seal may be carried out for only one surface.

According to the configuration in which the active material layer of the electrode and the inner layer of the laminated film are heat-sealed, in other words, a part of the battery element is secured to a part of the film, if impact force is applied to the battery, occurrence of displacement of the battery element within the battery can be suppressed, and occurrence of short and the like can be prevented. As long as such an effect can be expected, region, shape and/or pattern of heat seal between the active material layer and the inner layer may be changed accordingly.

Figure 5A:
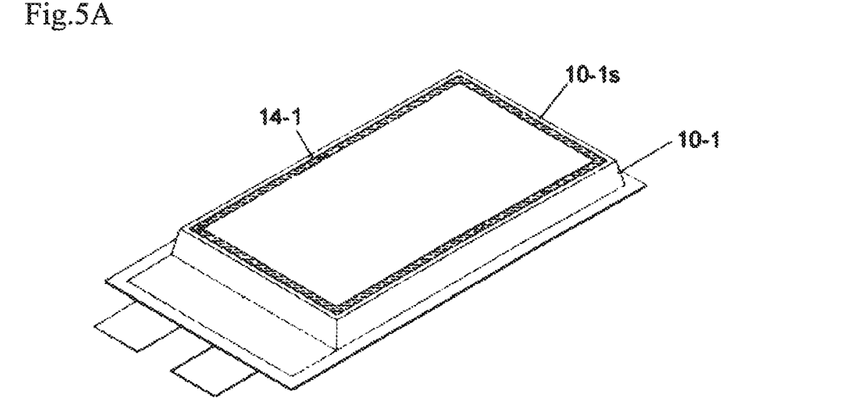
FIG. 5A is an example of heat-sealed surface between the inner surface of the film and the active material layer of the electrode.

For example, a heat-sealed portion 14-1 of a frame shape as shown in FIG. 5A may be used. It is noted that, in FIG. 5a, the heat-sealed portion 14-1 is schematically shown above the film for easy understanding (also in FIG. 5B and FIG. 5C). The heat-sealed portion 14-1 is formed along a position near the outer peripheral in a plane region 10-1s of the film 10-1. A central region of the plane region 10-1s is not heal-sealed. Ratio of the heat-sealed portion 14-1 relative to the plane region 10-1s may be 50% or less, 30% or less, or 20% or less in an area ratio.

Heat-sealing process for the frame shape heat-sealed portion 14-1 would be easier for example than heat-sealing for the entire surface in some cases. On the other hand, even such a configuration, the heat-sealed portion 14-1 having an area with a predetermined size enables the battery element to be secured sufficiently and stably.

With respect to the outermost electrode of the battery element, in some cases, it may be preferable to deactivate the function of the active material layer. In this regard, by forming the heat-sealed portion 14-1 in closed frame shape as shown in FIG. 5A, it is possible to prevent the electrolyte solution from entering into the inside of the heat-sealed portion 14-1, to thereby deactivate the function of the active material layer.

Figure 5B:
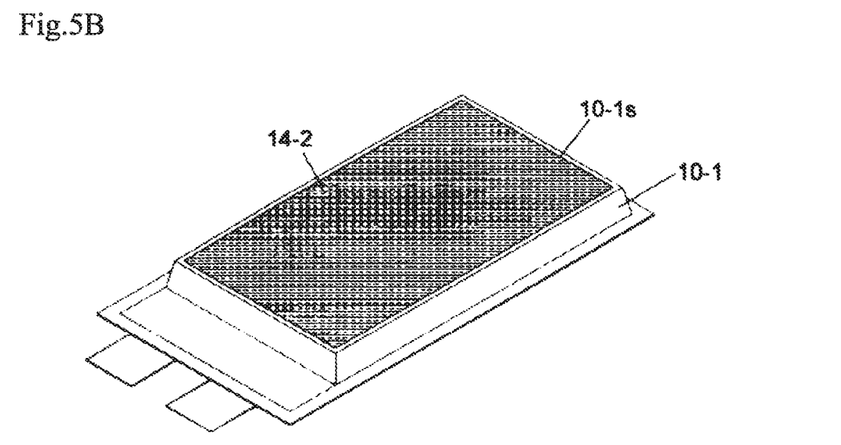
FIG. 5B is another example of heat-sealed surface between the inner surface of the film and the active material layer of the electrode.

It is also possible to use a flat type heat-sealed portion 14-2 as shown in FIG. 5B. Ratio of the heat-sealed portion 14-2 relative to the plane area 10-1s may be 50% or more, 70% or more, or 90% or more in area ratio. The entire activate material layer of the electrode may be heat-sealed. In the drawing, the heat-sealed portion is square shape in accordance with the shape of the plane area 10-1s, but the present invention is not limited thereto.

Figure 5C:
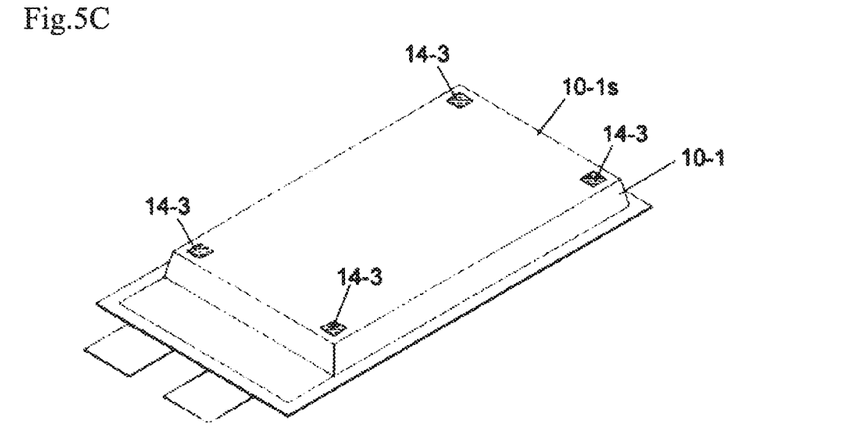
FIG. 5C is further example of heat-sealed surface between the inner surface of the film and the active material layer of the electrode.

A plurality of spot shape heat-sealed portions 14-3 may be used as shown in FIG. 5C. In this example, the heat-sealed portions 14-3 are formed at four corners of the plane area 10-1s of the film 10-1. Even such a configuration, it can achieve the same effect to prevent the displacement of the battery element as the above mentioned embodiment. Shape or number of the heat-sealed portion 14-3 can be changed accordingly. For example, a heat-seal portion of line shape, circle shape, square shape, or polygon shape may be used. Not at four corners, but the heat-sealed portions may be formed at a plurality of any positions such as at two positions, at three positions, at four positions in the plane area 10-1s. In a particular example, heat-sealed portion(s) of line shape may be formed along the one side, two sides, or multiple sides of the battery element.

Although the upper film 10-1 has been described in the above, of course the lower film 10-2 and the active material layer (either the positive electrode or the negative electrode is possible) of the electrode may be heat-sealed in a manner as above.

Any method may be used for carrying out the heat-sealing as above. A heat press machine or a roll press machine may be used.

(Heat Press Machine)

Heat-sealing may be carried out by using a heat-seal machine 70 as shown in FIG. 4. The heat press machine 70 has a pair of presser members for pressing the both sides of the battery. For example, by heating at 180° C. and pressing with the presser members, the heat-sealed portion is formed. Single presser member may be used, rather than a pair of presser members.

Even in such a case, since the separator has a melting point or decomposition point higher than that of the inner layer 13 of the laminated film 13 at least by 50° C. or more, effect of melting or shrinking is prevented.

Conditions such as a temperature, pressure and/or time for heat-sealing may be selected so that melted inner layer 13 can sufficiently engage into the concavo-convex of the surface of the electrode active material layer in order to increase connecting strength by anchoring effect. As shown in FIG. 4, heat-sealing on both of the upper surface and lower surfaces may be carried out simultaneously at once. Alternatively, two or more process may be used for the upper surface and lower surface, or for different heat-sealing positions. The heat-sealing may be at one position or two or more distant positions.

To avoid a harmful effect on electrolyte by heating during heat seal, it is possible to inject the electrolyte via a non-sealed portion formed in the peripheral portion of the packaging film, after heat-sealing the inner resin layers, except for at least one portion of the peripheral portion of facing films, and after heat-sealing the inner layer to the battery element.

(Heat Roll Press Machine)

Figure 6:
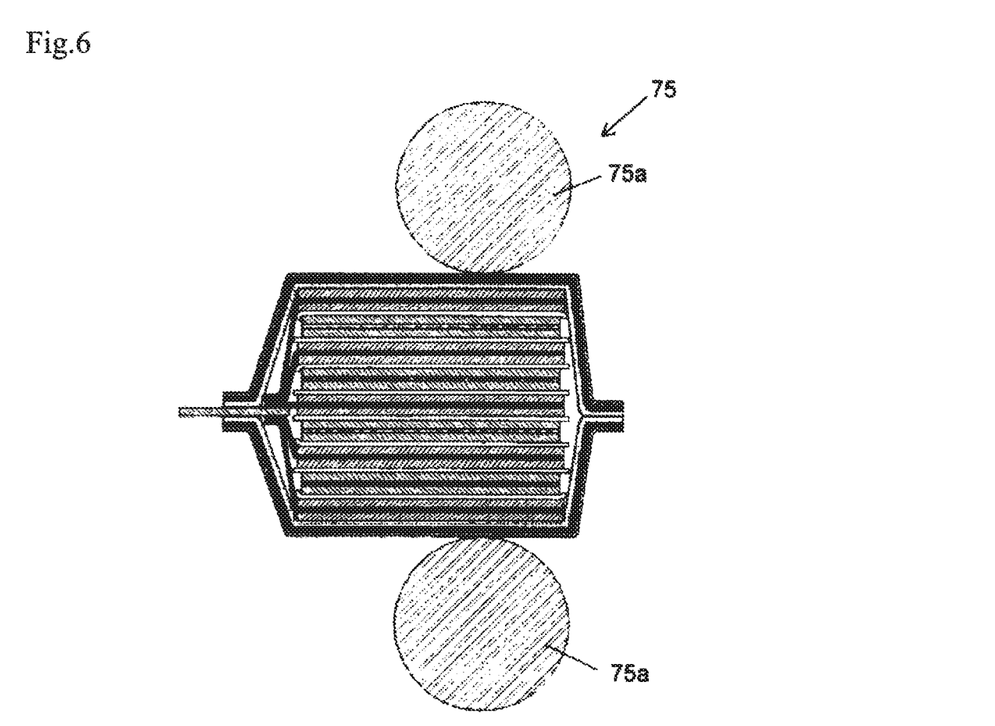
FIG. 6. is a schematic view that shows a manufacturing by using a roll press machine.

Alternatively, a heat roll press machine can be used for heat-sealing. As the heat roll press machine, a heat roll press machine 75 that has a pair of roller members 75a for heating during pressing the battery may be used. A machine having only one roller member 75a may be used.

(Examples of Specific Configuration of the Heat-sealed Portion)

Figure 7:
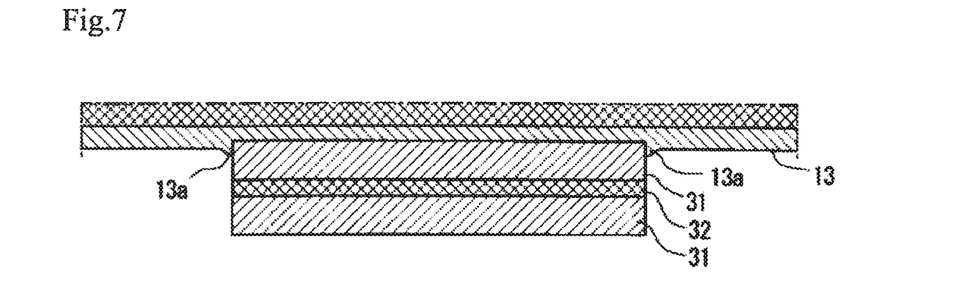
FIG. 7 is a sectional view that shows a specific configuration of the sealed portion between the inner surface of the film and the active material layer of the electrode.

In a state where the activate material layer of the electrode and inner layer of the film have been heal sealed, in one embodiment, a configuration as shown in FIG. 7 (only the outermost electrode on the battery element is shown) is obtained. Specifically, a part of the inner layer 13 forms a protruding portion 13a, and this protruding portion 13 a touches to at least a part of the side surface of the electrode. Although the positive electrode with the current collector 32 and active material layer 31 has been described here, of course, it is applicable to the negative electrode.

The protruding portion 13a is a thicker resin portion than that of the other part of the inner layer 13. The protruding portion may be formed after heating and pressing by the heat press machine or the roll press machine. According to a configuration where such a protruding portion 13a is formed and it is heat-sealed to (or touched to) at least the side surface of the battery element, it can be expected that holding strength of the battery element is improved compared with a configuration that has no such a portion.

Although the protruding portions 13a are formed at both sides of the activate material layer 13 in FIG. 7, it may be formed so that it surrounds the whole of the battery element. Alternatively, the protruding portion 13a may be formed at at least one side (specifically, at least a part of the side) of the battery element.

The thickness of the inner layer of the laminated film is, in one example, approximately 30 µm to 200 µm, preferably approximately 60 µm to 100 µm. The thickness of the electrode active material layer is, in one example, approximately 20 µm to 200 µm, preferably approximately 50 µm to 80 µm. The current collector, in one example, 5 µm to 30 µm.

According to the film packaged battery of the one embodiment of the present invention, since the active material layer (31, 41) of the outermost electrode (at least one electrode of the upper surface and the lower surface) of the battery element and the inner layer of the film (10-1, 10-2) are heat-sealed, and the battery element and film are secured, if an impact force is applied to the battery, displacement of the battery element tends not to happen, to thereby prevent occurrence of the short, for example.

Additionally, according to the configuration such as FIG. 5A and FIG. 5B, by covering at least a part of the electrode surface, which does not contribute to charging/discharging of the battery, with the heat sealable resin (inner layer), amount of the necessary electrolyte can be reduced, and it is possible to increase the battery capacity by restraining a consumption of supporting electrolyte such as irreversible lithium-ion.

<Other Inventions>

Figure 8:
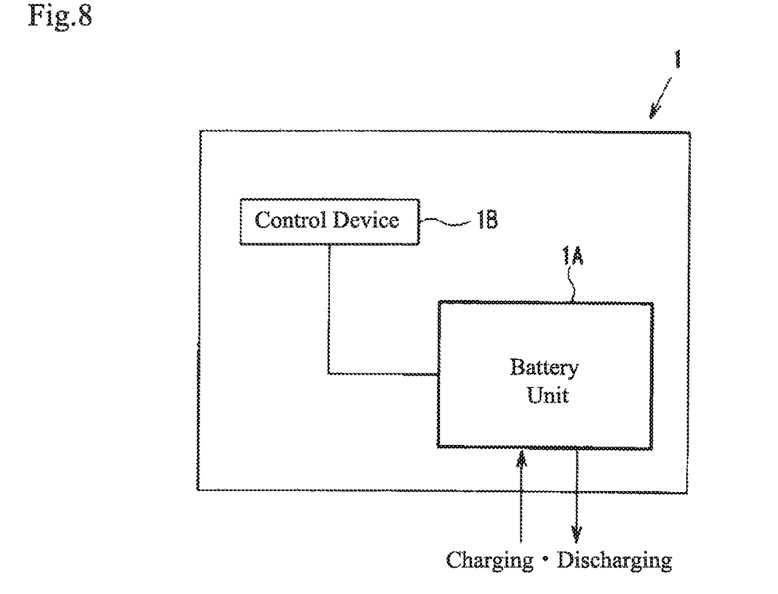
FIG. 8 is a schematic view of a storage system.

FIG. 8 is a schematic view of a storage system, which uses a secondary battery according to the embodiment of the present invention. The storage system 1 has, although the system is not limited to specific size, a battery unit 1A that includes at least one secondary battery (for example, the film packaged batter 3) and a control device 1B for, for example, monitoring and controlling the charging/discharging of the battery unit. As such a storage system 1, for example it may be a back-up battery, and can be used for a large facility, for an office, or for home use.

Figure 9:
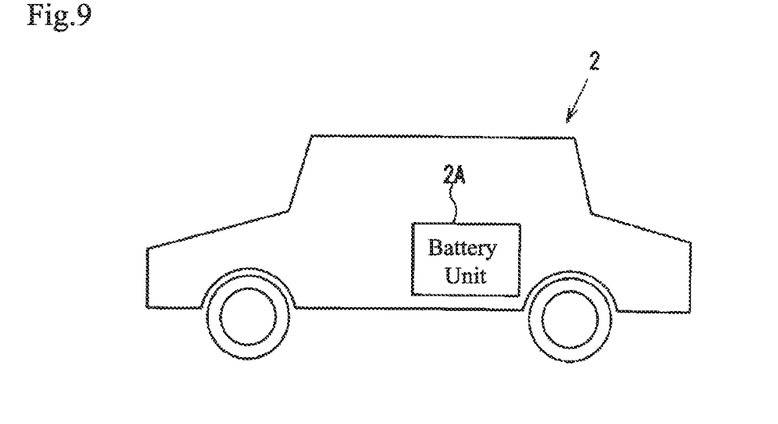
FIG. 9 is a schematic view of an electric vehicle

FIG. 9 is a schematic view of an electrical vehicle, which uses a secondary battery according to the embodiment of the present invention. The electrical vehicle 2 has a battery unit 2A that includes at least one secondary battery (for example, the film packaged batter 3) and a control device 2B for, for example, monitoring and controlling the charging/discharging of the battery unit.

(Supplimentaly Note)

The present application discloses the following inventions:

1. A secondary battery, comprising:

A: a battery element (20) having a positive electrode (30) wherein positive active material (31) are applied on both surfaces of a positive current collector (32), a negative electrode (40) wherein negative active material (41) are applied on both surfaces of a negative current collector (42), and a separator;

B: a packaging film (10), made of a film that includes a heat-seal resin layer (13), for accommodating the battery element;

a: wherein a melting point or a decomposition temperature of the separator is higher than a melting point of the heat-seal resin layer by 50° C. or more;

b: and wherein, at least a part of the active material layer (31, 41) of the positive electrode or the negative electrode and the heat-seal resin layer are heat-sealed to each other at at least one surface of the upper surface and the lower surface of the battery element.

2. The secondary battery according to the above, wherein the active material layers (31, 41) are heat-sealed to the heat-seal resin layers (13) on the both surfaces of the battery element.

3. The secondary battery according to the above, the electrode with the active material layer (31, 41) to which the heat-seal resin layer (13) is heat-sealed is either of the positive electrode or negative electrode.

4. The secondary battery according to the above, the heat-seal resin layer includes at least one of polypropylene or polyethylene.

5. The secondary battery according to the above, the separator is at least one selected from aramid, polyimide, polyester and cellulose.

6. The secondary battery according to the above, the separator includes a resin, the resin having a melting point increased by crosslinking polyethylene or polyproprene by means of an electron beam irradiation or adding a crosslinking agent.

7. The secondary battery according to the above, the separator is a woven fabric, a non-woven fabric or a fine porous membrane.

8. The secondary battery according to the above, wherein a sealed region between either of the positive active material layer or the negative active material layer and the heat-seal resin layer is a frame shape.

9. The secondary battery according to the above, wherein a sealed region between either of the positive active material layer or the negative active material layer and the heat-seal resin layer is a plat shape.

10. The secondary battery according to the above, wherein the secondary battery is a lithium ion secondary battery, a nickel hydrogen battery, a lithium ion capacitor, a nickel cadmium battery, a lithium metal primary battery, a lithium metal secondary battery or a lithium polymer battery.

11. An electric vehicle, comprising a battery source including a plurality of the secondary batteries according to the above.

12. A storage system, comprising a battery source including a plurality of the secondary batteries according to the above.

13. A manufacturing method of a secondary battery, comprising steps of:

preparing a battery element (20) having a positive electrode (30) wherein positive active material (31) are applied on both surfaces of a positive current collector (32), a negative electrode (40) wherein negative active material (41) are applied on both surfaces of a negative current collector (42), and a separator (60);

preparing a packaging film that includes a heat-seal resin layer (13) having a melting point which is lower than a melting point or a decomposition temperature of the separator by 50° C. or more;

carrying out a heat-sealing on a peripheral portion of the facing heat-seal resin layers to thereby form a heat-sealed portion (15) after surrounding the battery element with the heat-seal resin layers, and closing the inner space to seal the battery element in a battery element accommodating portion; and heat-sealing at least a part of the active material layer of the positive electrode or the negative electrode at at least one surface of the upper surface and the lower surface of the battery element to the heat-seal resin layer.

It is noted that the reference numerals in brackets in the above description does not intentionally limit the present inventions.

INDUSTRIAL APPLICABILITY

The secondary battery according to the embodiments of the present inventions can be used in any industrial fields that require batteries. For example, it can be used as a power source for mobile devices such as a cellular phone and a notebook personal computer; as a power source for an electric vehicle such as an electric vehicle, a hybrid car, an electric motorcycle, an electric assisted bicycle or the like; as a power source for transportation means such as a train, a satellite, a submarine or the like; and as a storage system for storing power.

REFERENCE NUMERAL LIST

1 STORAGE SYSTEM
2 ELECTRIC VEHICLE
3 FILM PACKAGED BATTERY
10 PACKAGING FILM
10-1, 10-2 FILM
11 SURFACE LAYER
12 METAL LAYER
13 INNER LAYER
14 HEAT-SEALED PORTION
15 HEAT-SEALED PORTION
20 BATTERY ELEMENT
30 POSITIVE ELECTRODE
40 NEGATIVE ELECTRODE
70 HEAT PRESS MACHINE
75 HEAT ROLL PRESS MACHINE

The invention claimed is:

1. A secondary battery, comprising:
a battery element having a positive electrode wherein positive active material are applied on both surfaces of a positive current collector, a negative electrode wherein negative active materials are applied on both surfaces of a negative current collector, and a separator;
a packaging film, made of a film that includes a heat-seal resin layer, for accommodating the battery element;
wherein a melting point or a decomposition temperature of the separator is higher than a melting point of the heat-seal resin layer by 50° C. or more;
and wherein, at least a part of the active material layer of the positive electrode or the negative electrode and the heat-seal resin layer are heat-sealed to each other at least one surface of the upper surface and the lower surface of the battery element.

2. The secondary battery according to claim 1, wherein the active material layers are heat-sealed to the heat-seal resin layers on the both surfaces of the battery element.

3. The secondary battery according to claim 1, the heat-seal resin layer includes at least one of polypropylene or polyethylene.

4. The secondary battery according to claim 1, the separator is at least one selected from aramid, polyimide, polyester and cellulose.

5. The secondary battery according to claim 1, the separator includes a resin, the resin having a melting point increased by crosslinking polyethylene or polyproprene by means of an electron beam irradiation or adding a crosslinking agent.

6. The secondary battery according to claim 1, the separator is a woven fabric, a non-woven fabric or a fine porous membrane.

7. The secondary battery according to claim 1, wherein a sealed region between either of the positive active material layer or the negative active material layer and the heat-seal resin layer is a frame shape.

8. The secondary battery according to claim 1, wherein a sealed region between either of the positive active material layer or the negative active material layer and the heat-seal resin layer is a plate shape.

9. The secondary battery according to claim 1, wherein the secondary battery is a lithium ion secondary battery, a nickel hydrogen battery, a lithium ion capacitor, a nickel cadmium battery, a lithium metal primary battery, a lithium metal secondary battery or a lithium polymer battery.

10. An electric vehicle, comprising a battery source including a plurality of the secondary batteries according to claim 1.

11. A storage system, comprising a battery source including a plurality of the secondary batteries according to claim 1.

12. A manufacturing method of a secondary battery, comprising steps of:
preparing a battery element having a positive electrode wherein positive active material are applied on both surfaces of a positive current collector, a negative electrode wherein negative active materials are applied on both surfaces of a negative current collector, and a separator;
preparing a packaging film that includes a heat-seal resin layer having a melting point which is lower than a melting point or a decomposition temperature of the separator by 50° C. or more;
carrying out a heat-sealing on a peripheral portion of the facing heat-seal resin layers to thereby form a heat-sealed portion after surrounding the battery element with the heat-seal resin layers, and closing the inner space to seal the battery element in a battery element accommodating portion; and
heat-sealing at least a part of the active material layer of the positive electrode or the negative electrode at least one surface of the upper surface and the lower surface of the battery element to the heat-seal resin layer.

13. The manufacturing method of a secondary battery according to claim 12, wherein the heat-sealing is carried out by heating at 180° C. with a presser member.

14. The secondary battery according to claim 1, wherein a sealed region between either of the positive active material layer or the negative active material layer and the heat-seal resin layer includes a plurality of spot shapes.

15. The secondary battery according to claim 1, wherein the positive electrodes and negative electrodes are stacked in a state in which the separator is interposed between the positive electrode and the negative electrode.

16. The secondary battery according to claim 1, wherein the heat-seal resin layer of the packaging film comprises a protruding portion that is in contact with at least a part of the side surface of the positive electrode or negative electrode.

* * * * *

UNITED STATES PATENT AND TRADEMARK OFFICE
CERTIFICATE OF CORRECTION

PATENT NO. : 10,587,002 B2
APPLICATION NO. : 15/560185
DATED : March 10, 2020
INVENTOR(S) : Makihiro Otohata

Page 1 of 1

It is certified that error appears in the above-identified patent and that said Letters Patent is hereby corrected as shown below:

In the Specification

Column 8, Description of Embodiments, Line 45; Delete "($0 \leq \alpha \leq 1.2$" and insert --($0 < \alpha \leq 1.2$-- therefor Signed and Sealed this
Twenty-first Day of July, 2020

Andrei Iancu
*Director of the United States Patent and Trademark Office*